May 16, 1950 R. H. HILL 2,507,633
BEVERAGE MAKING APPARATUS
Filed Oct. 10, 1947 3 Sheets-Sheet 1

INVENTOR.
Ralph H. Hill
BY
McMorrow, Berman + Davidson
Attorneys

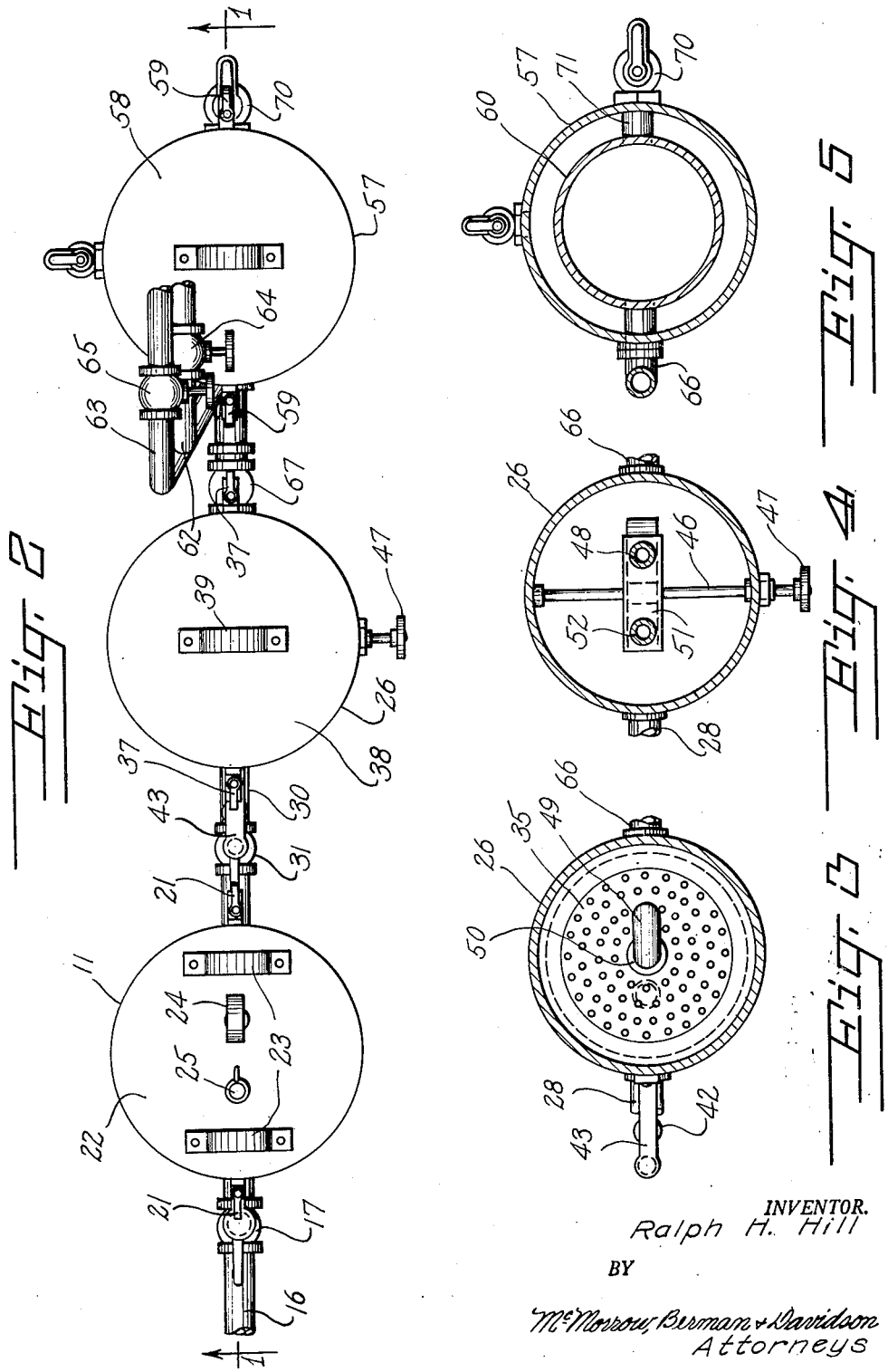

May 16, 1950 R. H. HILL 2,507,633
BEVERAGE MAKING APPARATUS
Filed Oct. 10, 1947 3 Sheets-Sheet 3
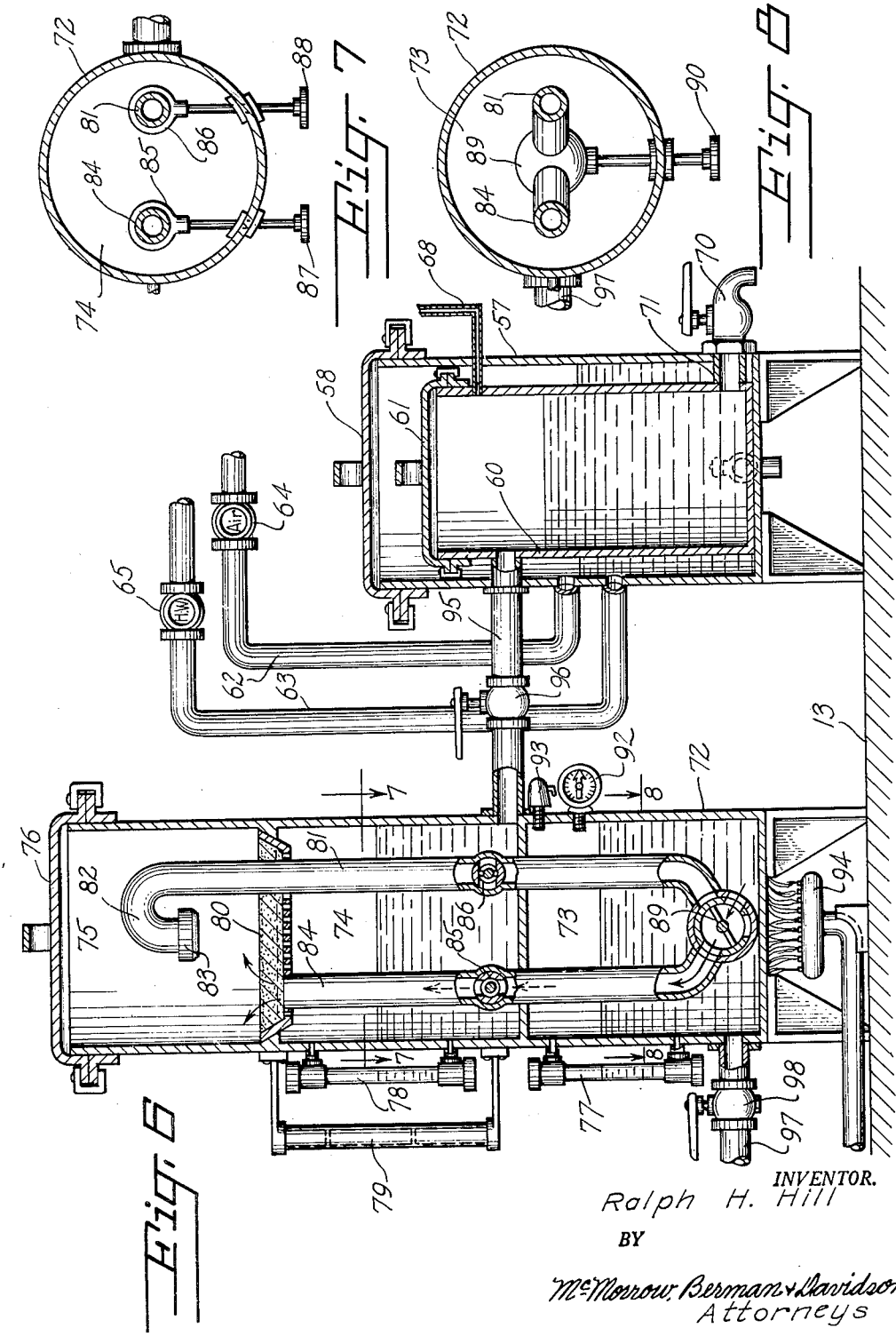
INVENTOR.
Ralph H. Hill
BY
McMorrow, Berman & Davidson
Attorneys Patented May 16, 1950

2,507,633

UNITED STATES PATENT OFFICE 2,507,633

BEVERAGE-MAKING APPARATUS

Ralph H. Hill, Flint, Mich.

Application October 10, 1947, Serial No. 779,095

6 Claims. (Cl. 99—307)

This invention relates to beverage making devices, and more particularly to an apparatus for making coffee or tea.

A main object of the invention is to provide a novel and improved beverage making apparatus which is simple in construction, easy to use and which is very economical to operate.

A further object of the invention is to provide an improved apparatus for making coffee, tea, or other beverages of like character, the apparatus providing selection means for brewing the beverage by percolating hot water either from a spray above the coffee grounds or tea leaves downwardly through said coffee grounds or tea leaves, or by infusion of the hot water upwardly through said coffee grounds or tea leaves, the apparatus providing greatly improved efficiency in the use of coffee grounds or tea leaves and further providing a finished beverage of high quality and appetizing flavor.

Further objects and advantages of the invention will become apparent from the following description and claims, and from the accompanying drawings, wherein:

Figure 2 is a top plan view of the apparatus of Figure 1.

Figure 3 is a cross-sectional detail view taken on line 3—3 of Figure 1.

Figure 4 is a cross-sectional detail view taken on line 4—4 of Figure 1.

Figure 5 is a cross-sectional detail view taken on line 5—5 of Figure 1.

Figure 6 is a longitudinal vertical cross-sectional view taken through a modified form of beverage making apparatus constructed in accordance with this invention.

Figure 7 is a cross-sectional detail view taken on line 7—7 of Figure 6.

Figure 8 is a cross-sectional detail view taken on line 8—8 of Figure 6.

Figure 1:
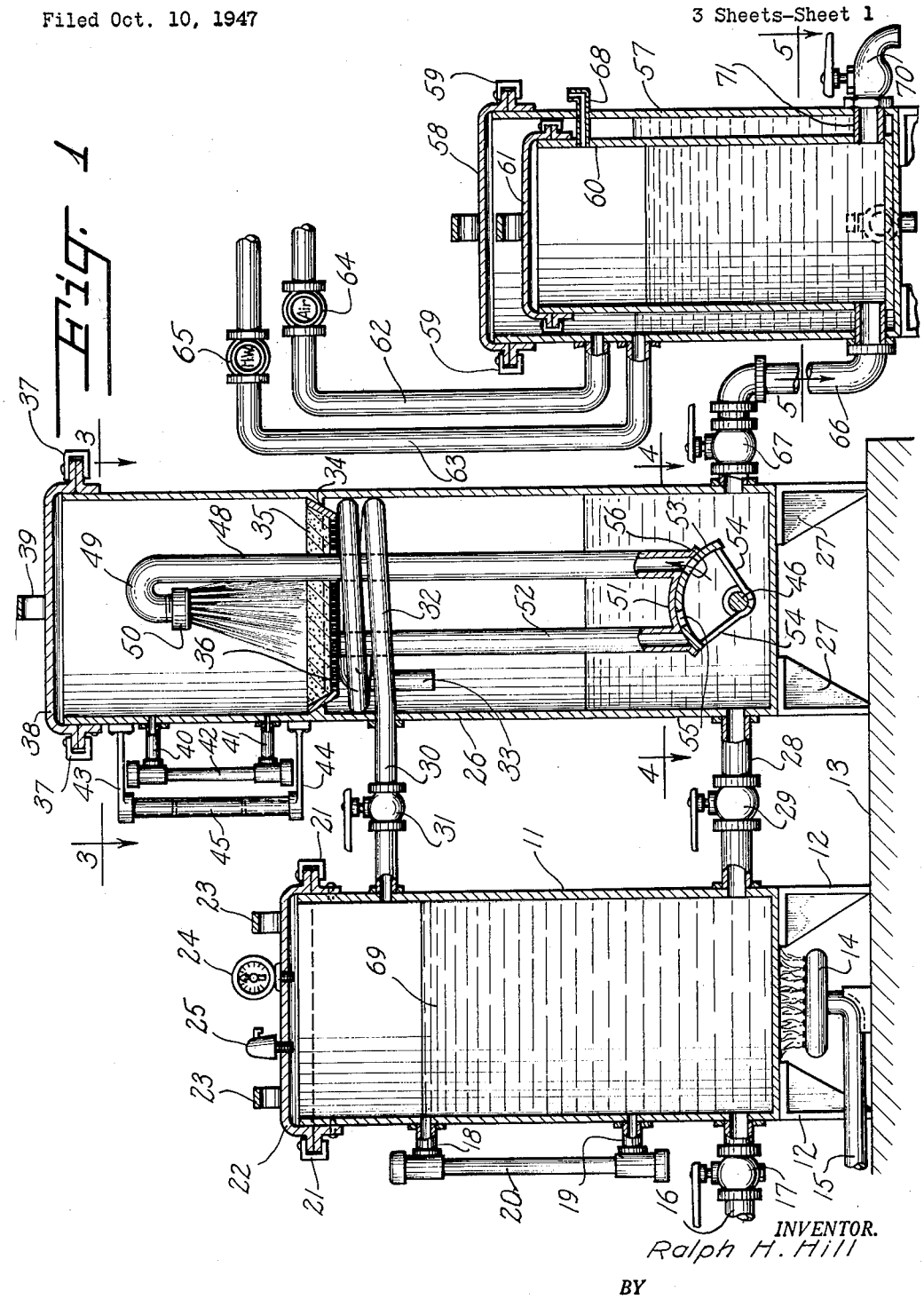
Figure 1 is a longitudinal vertical cross-sectional view taken through a beverage making apparatus constructed in accordance with the present invention, said view being taken on line 1—1 of Figure 2.

Referring to the drawings, 11 designates a vertical tank supported on suitable legs 12 secured to the bottom wall thereof and maintaining tank 11 in elevated position with respect to a horizontal base support 13. Positioned beneath the bottom wall of tank 11 and supported on base member 13 is a burner 14, for example, a gas burner, provided with a connection to a suitable fuel source comprising a conduit 15. The lower portion of tank 11 is connected by a conduit 16 through a valve 17 to a source of city water. Connected to tank 11 by respective upper and lower conduit sections 18 and 19 is a transparent sight tube 20 whereby the level of water in tank 11 may be observed during the operation of the apparatus. Secured to the top of tank 11 by suitable clamp fasteners 21, 21 is a cover 22 provided with handles 23, 23. Mounted on cover 22 is a pressure gage 24 and a safety valve 25, said gage and safety valve communicating with the upper interior portion of tank 11.

Designated at 26 is a second vertical tank having legs 27, 27 supporting said tank 26 on the base member 13 adjacent to the first tank 11. The lower portion of tank 11 is connected to the lower portion of tank 26 by a conduit 28 provided with a valve 29. The upper portion of tank 11 is connected to tank 26 by a conduit 30 provided with a valve 31. Inside tank 26 the conduit 30 is formed into a heating coil 32, the end of the conduit being directed downwardly, as shown at 33. Above the coiled conduit 32 the internal wall of tank 26 is formed with an upwardly flaring annular rib 34 on which is removably supported a pan 35 having a perforated bottom wall 36. Pan 35 contains the coffee grounds, tea leaves, or other comminuted beverage derivative material employed in brewing the beverage.

Secured to the top of tank 26 by suitable clamp fasteners 37, 37 is a top cover 38 provided with a handle 39. Connected to the portion of the tank 26 above pan 35 by respective upper and lower conduit sections 40 and 41 is a transparent vertical sight tube 42. Supported in respective upper and lower brackets 43 and 44 secured to tank 26 adjacent the sight tube 42 is a transparent sight tube 45. Tube 45 contains a liquid having a color which corresponds to the color of the desired strength of beverage. In the process of making the beverage, the liquid in tube 42 is compared with the liquid in tube 45, and the operation of the apparatus is discontinued when the color of liquid in tube 42 is observed to be identical with that in tube 45. Additional tubes such as 45, may be mounted on the tank adjacent tube 42 containing liquids of various shades of color, corresponding to various strengths of the beverage being made. By comparing the color of the beverage in tube 42 with different comparison tubes, any one of a plurality of different beverage strengths may be obtained.

Transversely journalled in the lower portion of tank 26 is a shaft 46. Shaft 46 extends through the front wall portion of tank 26 and secured to the end of the shaft is a handle 47. Secured to the perforated bottom wall 36 of pan 35 is a vertical conduit 48 formed at its top end with a U-bend 49. Secured to the end of the U-bend is a perforated cap 50. Secured to the bottom end of conduit 48 is an arcuate plate member 51 which is downwardly concave and which has its axis of curvature at shaft 46. Secured to plate member 51 is a vertical conduit 52 whose top end terminates just below the perforated bottom wall 36 of pan 35. The lower ends of conduits 48 and 52 communicate with the space below arcuate plate member 51 except when they are covered by an arcuate valve member 53 which is secured to shaft 46 by radial arms 54, 54. Valve member 53 is formed with spaced apertures 55 and 56 adapted to register with the bottom ends of the respective conduits 52 and 48 but having a different angular spacing with respect to shaft 46 than the bottom ends of said conduits. When shaft 46 is rotated to a position wherein aperture 56 is in registry with the bottom end of conduit 48, conduit 52 is sealed at its bottom end by valve member 53, and vice versa.

Designated at 57 is a third tank which may be in any suitable location remote from tanks 11 and 26. Tank 57 has a top cover 58 removably secured to the top of the tank by clamp fasteners 59, 59. Rigidly secured inside tank 57 is a storage vessel 60, also provided with a top cover 61. Connected to tank 57 and communicating with the space between tank 57 and inner tank 60 are respective conduits 62 and 63 provided with respective valves 64 and 65. Conduit 63 may be employed to admit hot water or steam to the space between tanks 57 and 60. Conduit 62 may be employed to admit cold air to said space, where it is desired to refrigerate or cool the inner tank 60. A conduit 66 connects the lower portion of inner tank 60 to the lower portion of tank 26 through a valve 67.

The top portion of inner tank 60 is vented to atmosphere by a vent conduit 68.

In operation, water shown at 69 in tank 11 is heated by burner 14 to an elevated temperature, steam being formed in the upper portion of said tank. The steam pressure is indicated on gage 24. Valve 29 is opened, admitting hot water into tank 26 through conduit 28, and is then closed.

Assuming that beverage of the "percolated" type is desired, handle 47 is rotated so that valve aperture 53 is registered with the bottom end of conduit 48. Valve 31 is opened, admitting steam through conduit 30 and coil 32 into the space immediately below pan 35 in tank 26. The steam acting on the hot water in tank 26 forces it upwardly through conduit 48 and through the U-bend 49, causing the water to spray through the perforated head 50 onto the coffee grounds or tea leaves in the pan 35. The water drips through the bottom wall 36 of the pan after a period of contact with the coffee grounds or tea leaves during which steeping action occurs. This action may be continued until a comparison of the sight tubes 42 and 45 indicates that the beverage has reached its desired strength, at which time, valve 31 is closed, terminating the percolating action. The beverage may then be admitted into tank 60 through conduit 66 by opening valve 67 until a desired quantity of beverage is contained in said tank 60. A drain faucet 70 for removing the beverage is provided, said drain faucet being connected to the bottom portion of inner tank 60 by means of a short conduit section 71 connecting the faucet to the inner tank through the intervening space between the outer tank 57 and said inner tank.

The inner tank 60 is at a lower level than tank 26 so that the beverage will flow to tank 60 by gravity.

Where beverage of the infused type is desired rather than the "percolated" type, handle 47 is rotated so that aperture 55 is registered with the lower end of conduit 52. The hot water in tank 26 is then forced upwardly through conduit 52 by the steam pressure in the upper portion of the tank and is forced continuously through the perforated bottom wall 36 of pan 35, remaining in pan 35 for a sufficient period for the desired steeping to take place, after which it drips back into the lower portion of tank 26. Due to the resistance to free return flow offered by the pan 35 and the material contained therein, both in the case of "percolating" action previously described, and the "infusing" action now discussed, the liquid rises to a sufficient height above pan 35 to be observed in the sight tube 42. Therefore, when beverage of the desired strength is observed in said sight tube, the valve 31 is closed to terminate the brewing action, as in the previously described method of operation of the apparatus.

A preferred method of operation of the apparatus consists of admitting hot water from tank 11 into tank 26 and then closing valve 29. Valve 31 is then opened. The valve member 53 is then rotated to alternately register aperture 56 with conduit 48 and aperture 55 with conduit 52, so that liquid will be forced up conduit 48 and conduit 52 alternately. This is continued until the beverage is of the desired strength. Valve 31 is then closed.

To obtain prolonged steeping action of the liquid in the upper portion of tank 26, valve 31 is maintained open with valve member 53 covering the bottom ends of both conduits 48 and 52, whereby the steam pressure in the intermediate portion of tank 26 prevents the liquid from dripping through the perforated bottom wall 36 of pan 35 at any appreciable rate. When the beverage has reached the desired strength, valve 31 is closed, and the steam pressure in tank 26 is allowed to drop. The beverage drips into the lower portion of tank 26 and may be admitted into tank 60 by opening valve 67.

In the embodiment of the invention illustrated in Figures 6, 7 and 8, the first two tanks of the apparatus of Figure 1 are combined in a single tank 72. Tank 72 comprises a lower compartment 73, an intermediate compartment 74 and a top compartment 75 to which is releasably secured a top cover 76. At the lower portion of tank 72 is a sight tube 77 communicating with compartment 73. At the intermediate portion of tank 72 is a sight tube 78 communicating with compartment 74. Secured to the tank wall adjacent sight tube 78 is the comparison tube 79. The top wall of compartment 74 comprises the drip pan 80 similar to pan 35 of Figure 1. A first vertical conduit 81 extends from the lower portion of compartment 73 through compartment 74 and upwardly into compartment 75, the top of conduit 81 being formed with the inverted U-bend 82 and having a spray head 83 secured to its end. A second vertical conduit 84 extends from the lower portion of compartment 73 through compartment 74 and is connected to the bottom wall of pan 80. Conduits 84 and 81 are provided with respective valves 85 and 86 controlled respectively by knobs 87 and 88 externally of the tank 72. Connected to the lower ends of conduits 84 and 81 is a two-way valve 89 controlled by a knob 90 externally of tank 72. Valve 89 is arranged to selectively admit liquid from compartment 73 to either conduit 84 or 81. Connected to the upper portion of compartment 73 is a pressure gage 92 and a safety valve 93. A burner 94 is positioned below the bottom of tank 72.

The bottom portion of compartment 74 is connected to tank 60 by a conduit 95 which includes a valve 96. Cold water is admitted to the lower portion of compartment 73 by a water supply conduit 97 which includes a supply control valve 98.

In operation, the water in compartment 73 is heated by the burner 94, developing steam pressure in the upper portion of the compartment. With the valve 85 closed and valve 86 open, valve 89 may be set so that conduit 81 communicates with the water in compartment 73, whereby the water is forced upwardly in conduit 81 and is sprayed onto the coffee grounds or tea leaves in pan 80 and drips into compartment 74. With valve 86 closed and valve 85 open, valve 89 may be set so that conduit 84 communicates with the water in compartment 73, whereby the water is forced upwardly in conduit 84 through the pan 80, and drips back into compartment 74 after infusing through the coffee grounds or tea leaves in said pan. As in the previous embodiment of the invention, the liquid may be fed alternately through the conduits 81 and 84 until the desired strength is reached. By opening the valve 96, the beverage may be admitted into tank 60 for dispensing therefrom by the faucet 70.

While certain specific embodiments of a beverage making apparatus have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a beverage making apparatus, a closed water heating chamber, a second chamber, a tray containing beverage-making material in said second chamber, said tray having a perforated bottom wall, a pair of vertical conduits in said second chamber communicating with said water-heating chamber, one of said conduits rising above the tray and the other conduit terminating adjacent the bottom of the tray, and means for selectively forcing water from said heating chamber upwardly through either said one or said other conduit into contact with the beverage-making material.

2. In a beverage making apparatus, a closed water heating chamber, a second chamber, a tray containing beverage-making material in said second chamber, said tray having a perforated bottom wall, a first vertical conduit in said second chamber communicating with said water-heating chamber extending above said tray, a second vertical conduit in said second chamber communicating with said water-heating chamber and terminating adjacent the bottom of the tray, means for transmitting steam pressure from said heating chamber to the bottom ends of said conduits, and means for selectively admitting hot water from said heating chamber to the bottom end of either said first conduit or said second conduit, whereby the steam pressure will force the water upwardly through the conduits into contact with the beverage-making material.

3. In a beverage making apparatus, a vertical tank, a tray containing beverage making material in said tank and defining an upper space and a lower space therein, the bottom wall of said tray being perforated, the lower space being adapted to contain hot water, means for heating the water and for generating steam pressure in the lower space above the surface of the water, a first vertical conduit in said tank extending from said lower space below the water surface into said upper space above the tray, a second vertical conduit in said tank extending from said lower space below the water surface and terminating adjacent the bottom of the tray, and selective valve means for closing off the lower end of either the first conduit or the second conduit.

4. A beverage making apparatus comprising a water heating chamber, a second chamber, a tray containing beverage making material in said second chamber, the bottom wall of said tray being perforated, a first vertical conduit in said second chamber extending from the lower space therein to the space above the tray, a second vertical conduit in said second chamber extending from the lower space therein to the bottom of said tray, first conduit means connecting the lower portion of said water heating chamber to the lower portion of said second chamber, second conduit means connecting the upper portion of said water heating chamber to the space sub-adjacent the tray in said second chamber, selective valve means for closing off the lower end of either said first vertical conduit or said second vertical conduit, a beverage dispensing tank, and conduit means connecting the lower portion of said second chamber to the beverage dispensing tank.

5. A beverage making apparatus comprising a vertical tank, means defining a lower compartment and an upper compartment in said tank, heating means beneath said lower compartment, a tray containing beverage making material in said upper compartment, the bottom wall of said tray being perforated, a first vertical conduit in said tank extending from the lower compartment to the space above said tray, a second vertical conduit in said tank extending from the lower compartment to the bottom of said tray, selective valve means for closing off the lower end of either said first vertical conduit or said second vertical conduit, a beverage dispensing tank, and conduit means connecting the lower portion of said upper compartment to said beverage dispensing tank.

6. In a beverage-making apparatus, a closed water-heating chamber, a second chamber, a tray containing beverage-making material in said second chamber, said tray having a perforated bottom wall, a pair of vertical conduits in said second chamber communicating with said water-heating chamber, a rotatable valve member disposed adjacent the lower ends of the conduits and arranged to selectively close off said lower ends, and means for forcing water from said heating chamber upwardly through said conduits into contact with the beverage-making material.

RALPH H. HILL.

REFERENCES CITED

The following references are of record in the file of this patent:

UNITED STATES PATENTS

| Number | Name | Date |
|---|---|---|
| 51,198 | Lee | Nov. 28, 1865 |
| 378,296 | Ehrlich | Feb. 21, 1888 |
| 423,127 | Childs | Mar. 11, 1890 |
| 429,139 | Malen | June 3, 1890 |
| 747,705 | Heinrichs | Dec. 22, 1903 |
| 1,300,175 | Kittinger | Apr. 8, 1919 |
| 1,472,704 | Ward | Oct. 30, 1923 |
| 1,802,268 | Onofrio | Apr. 21, 1931 |

FOREIGN PATENTS

| Number | Country | Date |
|---|---|---|
| 684,356 | France | Mar. 17, 1930 |